United States Patent
Jang et al.

(10) Patent No.: US 9,120,225 B2
(45) Date of Patent: Sep. 1, 2015

(54) ROBOT AND CONTROL METHOD FOR THE SAME

(71) Applicant: Samsung Electronics Co., Ltd., Suwon-si (KR)

(72) Inventors: Jun Won Jang, Yongin-si (KR); Kyung Shik Roh, Seongnam-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 84 days.

(21) Appl. No.: 13/686,061

(22) Filed: Nov. 27, 2012

(65) Prior Publication Data

US 2013/0138245 A1    May 30, 2013

(30) Foreign Application Priority Data

Nov. 29, 2011    (KR) .................. 10-2011-0126257

(51) Int. Cl.
 *B25J 9/16*    (2006.01)
(52) U.S. Cl.
 CPC ..... *B25J 9/1612* (2013.01); *G05B 2219/39486* (2013.01); *G05B 2219/39497* (2013.01); *G05B 2219/39531* (2013.01); *G05B 2219/39536* (2013.01)
(58) Field of Classification Search
 CPC ............ G05B 2219/39531; G05B 2219/39536
 See application file for complete search history.

(56) References Cited

U.S. PATENT DOCUMENTS

| | | | | |
|---|---|---|---|---|
| 5,945,798 | A * | 8/1999 | Stagnitto et al. | 318/568.11 |
| 8,380,342 | B2 * | 2/2013 | Ban et al. | 700/218 |
| 2002/0173237 | A1 * | 11/2002 | Barns et al. | 451/36 |
| 2004/0140787 | A1 * | 7/2004 | Okamoto et al. | 318/568.21 |
| 2006/0131908 | A1 * | 6/2006 | Tadano | 294/111 |
| 2006/0158146 | A1 * | 7/2006 | Tadano | 318/568.21 |
| 2008/0013958 | A1 * | 1/2008 | Katsuki et al. | 398/130 |
| 2008/0133058 | A1 * | 6/2008 | Ohno | 700/259 |
| 2009/0018700 | A1 * | 1/2009 | Okamoto et al. | 700/260 |
| 2009/0025502 | A1 * | 1/2009 | Nakamoto | 74/490.01 |
| 2010/0235145 | A1 * | 9/2010 | Ascari et al. | 702/190 |
| 2012/0059517 | A1 * | 3/2012 | Nomura | 700/259 |

FOREIGN PATENT DOCUMENTS

| | | |
|---|---|---|
| JP | 07-164363 | 6/1995 |
| JP | 2006-167837 | 6/2006 |
| JP | 2010-069542 | 4/2010 |

* cited by examiner

*Primary Examiner* — Khoi Tran
*Assistant Examiner* — Ryan Rink
(74) *Attorney, Agent, or Firm* — Harness, Dickey & Pierce, P.L.C.

(57) ABSTRACT

A robot, which may accurately detect whether or not the robot is gripping an object, even without a tactile sensor, as a result of using a sorter that utilizes a torque generated from a joint of a hand and the shape of the hand as feature data, and a control method for the robot includes a state sensing unit to sense a state of the robot, a feature vector producing unit to extract feature data from the state sensing unit and to produce a feature vector using the feature data, and a learning-based data sorter to judge an operating state of the robot using the feature vector produced by the feature vector producing unit and to output the judged result.

18 Claims, 10 Drawing Sheets

ROBOT AND CONTROL METHOD FOR THE SAME

CROSS-REFERENCE TO RELATED APPLICATIONS

This application claims the priority benefit of Korean Patent Application No. 10-2011-0126257, filed on Nov. 29, 2011 in the Korean Intellectual Property Office, the disclosure of which is incorporated herein by reference.

BACKGROUND

1. Field

The following description relates to a robot having a function of gripping an object, and a control method for the same.

2. Description of the Related Art

One function provided by a robot is to grip an object using a hand, based on a user command. For example, in the case of a household service robot, gripping an object provides very useful services, such as a retrieval of an object, such as a cup or a book, or transferral of an object to another place, for example.

Accordingly, technologies to control a grip of an object by a robot have become very important in robot control. To control a grip of an object by a robot, it may be necessary to detect whether or not a robot has gripped an object. Based on the result of whether or not a robot has correctly gripped an object, whether to perform a subsequent motion or to retry a grip of an object may be determined.

In the related art, a tactile sensor has been mounted to a hand to judge whether the hand is in contact with an object and to detect whether or not a robot has gripped an object with the hand. However, the tactile sensor may be unsuitable to be mounted to a robot because of a high price thereof or limitations in size and curvature, for example.

Although a method of measuring current applied to a joint motor of a hand has been contemplated to negate use of the tactile sensor, this method may have a high degree of error under an influence of friction, and thus may have poor reliability.

SUMMARY

Therefore, it is an aspect of the disclosure to provide a robot, which may accurately detect whether or not a robot is gripping an object, even without a tactile sensor, as a result of using a sorter that utilizes a torque generated from a joint of a hand and the shape of the hand as feature data, and a control method for the robot.

Additional aspects of the invention will be set forth in part in the description which follows and, in part, will be obvious from the description, or may be learned by practice of the invention.

In accordance with an aspect of the disclosure, a robot having a hand includes a state sensing unit to sense a state of the robot, a feature vector producing unit to extract feature data from the state sensing unit and to produce a feature vector using the feature data, and a learning-based data sorter to judge an operating state of the robot using the feature vector produced by the feature vector producing unit and to output the judged result.

The state sensing unit may sense a torque generated from a joint included in the hand of the robot, or a position of a finger member included in the hand of the robot.

The data sorter may judge whether or not the hand is gripping an object, and outputs the judged result.

The data sorter may judge whether or not the hand is gripping the object using a feature vector related to at least one of a shape of the hand, a value of torque generated from the joint of the hand, and a combination of the shape of the hand and the value of torque generated from the joint of the hand.

The data sorter may include a first sorter adopting a feature vector related to a shape of the hand, a second sorter adopting a feature vector related to a value of torque generated from the joint of the hand, and a third sorter using a feature vector related to a combination of the shape of the hand and the value of torque generated from the joint of the hand.

The robot may further include a performance evaluator to evaluate a performance of each of the first sorter to the third sorter, and to store the evaluated result.

The robot may further include a sorter selector to select one of the first sorter to the third sorter based on the evaluated result of the performance evaluator.

The feature vector producing unit may produce a feature vector corresponding to the data sorter selected by the sorter selector.

In accordance with an aspect of the disclosure, a control method for a robot having a hand includes sensing torque generated from a joint included in the hand, or a position of a finger member included in the hand, producing a feature vector from the sensed result, and judging an operating state of the robot by inputting the produced feature vector to a learning-based data sorter, and outputting the judged result.

The judgment of the operating state of the robot may include judging whether or not the hand of the robot is gripping an object.

The feature vector may be at least one of a feature vector related to a torque generated from the joint of the hand, a feature vector related to a shape of the hand, and a feature vector related to a combination of the torque generated from the joint of the hand and the shape of the hand.

The data sorter may include a first sorter adopting a feature vector related to a shape of the hand, a second sorter adopting a feature vector related to a value of torque generated from the joint of the hand, and a third sorter using a feature vector related to a combination of the shape of the hand and the value of torque generated from the joint of the hand.

The control method may further include selecting the data sorter having the highest performance among the first sorter to the third sorter.

The selection of the data sorter may be based on the result of searching a performance database in which the result of evaluating performance of the data sorter is stored.

The production of the feature vector may include producing a feature vector to be adopted by the selected data sorter.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
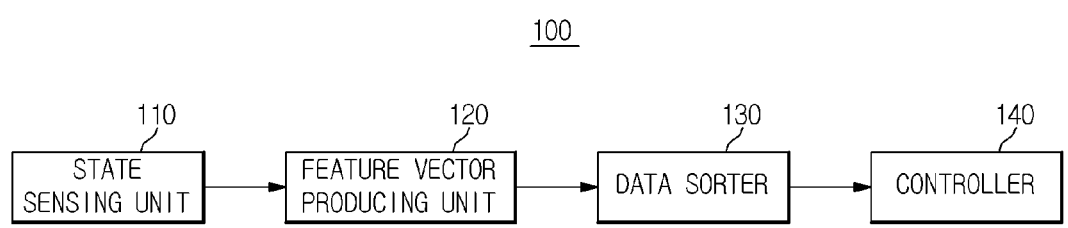
FIG. 1 is a control block diagram of a robot according to an embodiment.

Reference will now be made in detail to the embodiments of the present invention, examples of which are illustrated in the accompanying drawings, wherein like reference numerals refer to like elements throughout.

FIG. 1 is a control block diagram of a robot according to an embodiment.

Referring to FIG. 1, the robot 100 according to an embodiment includes a state sensing unit 110 to sense the state of the robot, a feature vector producing unit 120 to produce a feature vector from data corresponding to the sensed result of the state sensing unit 110, a data sorter 130 to judge an operating state of the robot upon receiving the feature vector produced by the feature vector producing unit 120, and a controller 140 to control the robot based on the judged result of the data sorter 130.

The robot according to an embodiment may judge whether or not the robot is in a particular operating state based on various measurable states of the robot. In the embodiments that will be described hereinafter, it is considered that whether or not the robot is gripping an object is judged by sensing a state related to a robot hand.

Figure 2:
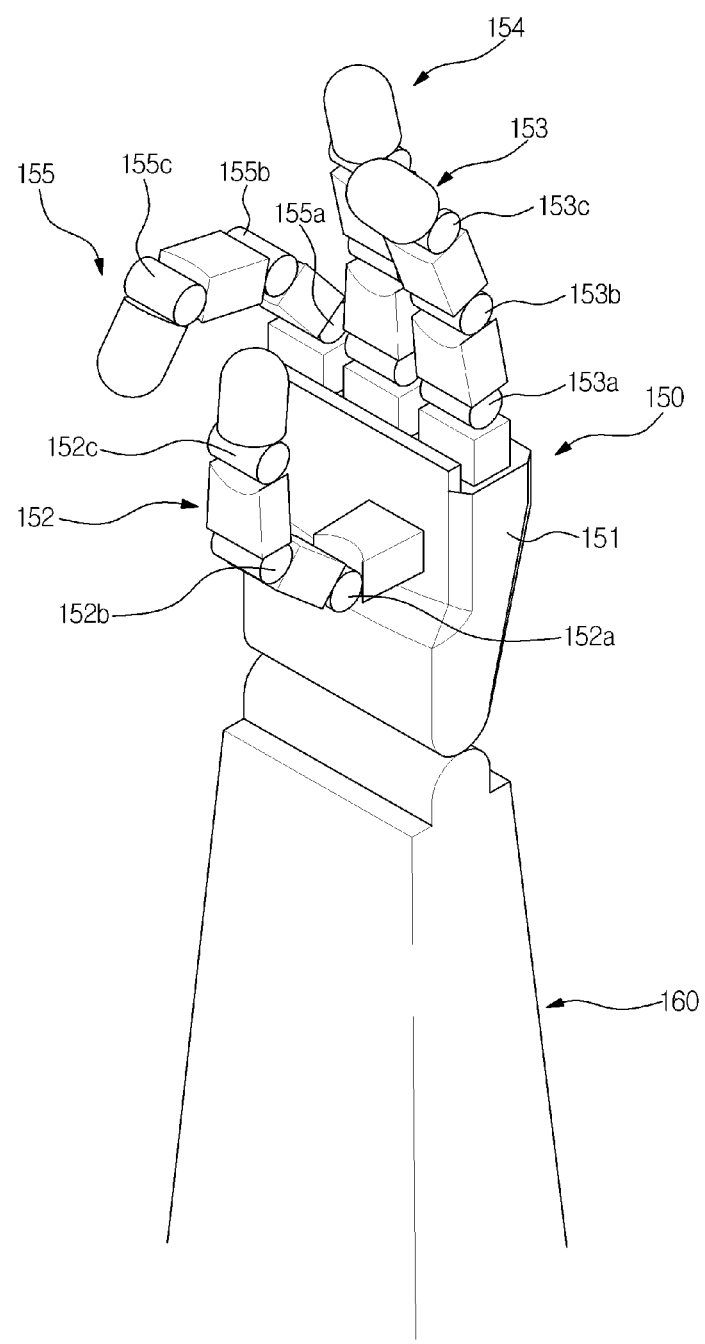
FIG. 2 is a perspective view schematically showing the configuration of a robot hand according to an embodiment.
Figure 3:
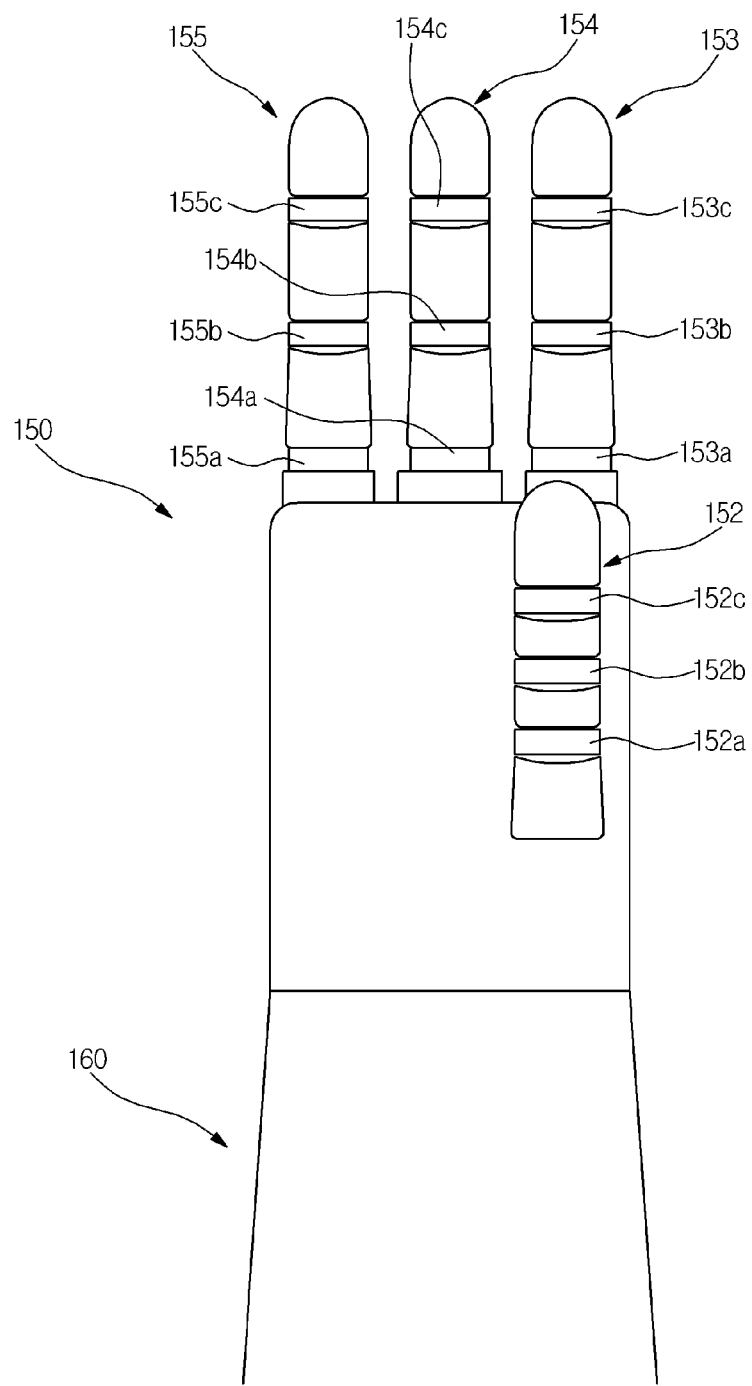
FIG. 3 is a front view schematically showing the configuration of the robot hand according to an embodiment.

FIG. 2 is a perspective view schematically showing the configuration of a robot hand according to an embodiment, and FIG. 3 is a front view schematically showing the configuration of the robot hand according to an embodiment.

As shown in FIGS. 2 and 3, the robot hand 150 according to an embodiment includes a hand body 151 and a plurality of finger members 152, 153, 154, and 155 connected to the hand body 151 via finger joints. The hand body 151 is connected to a robot arm 160 via a wrist joint. When an actuator (not shown) applies a drive force to the wrist joint, the hand body 151 may rotate relative to the robot arm 160.

Each of the finger members 152, 153, 154, and 155 includes a plurality of knuckles, and finger joints 152*a-c*, 153*a-c*, 154*a-c*, and 155*a-c* interposed between the respective knuckles, to allow the finger members to perform bending and spreading motions. Thus, when an appropriate drive force is applied to the respective finger joints 152*a-c*, 153*a-c*, 154*a-c*, and 155*a-c* to cause rotation of the respective knuckles, the finger members 152, 153, 154, and 155 may be bent to grip an object.

Although in the embodiment of FIGS. 2 and 3 the robot hand 150 includes four finger members, the disclosure is not limited thereto, and the number of finger members is not limited so long as they can grip an object.

Hereinafter, the control block diagram of FIG. 1 will be described in detail according to an embodiment in which the robot hand 150 is gripping an object.

The state sensing unit 110 includes a variety of sensors to sense the state of the robot, and more particularly, the state of the robot hand 150. In an embodiment, the state sensing unit may include a torque sensor (not shown) that measures a joint torque generated at each finger joint of the robot hand 150, and a position sensor (not shown) that senses a location of each finger member. The torque sensor may be a magnetostrictive torque sensor, a strain gauge torque sensor, or a phase difference torque sensor, for example, and is not limited to a particular type. The position sensor may be, for example, a distance sensor that senses a position of the finger member in X-, Y-, and Z-directions.

The feature vector producing unit 120 extracts feature data from the sensed result of the state sensing unit 110 and produces a feature vector. For example, in the case in which the data sorter 130 that will be described hereinafter adopts a feature vector related to a finger joint torque, the feature vector producing unit 120 extracts data related to the finger joint torque from the state sensing unit 110, and produces a feature vector using the extracted data.

Assuming that the robot primarily uses the first finger member 152, the second finger member 153, and the third finger member 154 when gripping an object, a total of nine finger joints are used to grip the object, and thus, values of torque generated from the nine joints may be feature data. As such, the feature vector producing unit 120 extracts torque data related to the nine joints from the state sensing unit 110, and produces a 9-dimensional (9D) feature vector using the extracted torque data. Additionally, if finger member 155 is also used to grip the object, the feature vector producing unit 120 may extract torque data related to the twelve joints, and produce a 12-dimensional (12D) feature vector using the extracted torque data. Torque data extracted from any number of finger joints may be used to produce a feature vector with a dimensional size equivalent to the number of finger joints used to produce the feature vector.

The data sorter 130 judges whether or not the robot is gripping an object upon receiving the feature vector from the feature vector producing unit 120, and outputs the judged result. A detailed description of the data sorter 130 will follow later.

The controller 140 controls general operations of the robot based on the output result of the data sorter 130. For example, if the controller 140 sent an object grip command to the hand 150, but the output result of the data sorter 130 indicates that the robot is not gripping an object, the controller 140 resends a grip command for the object.

Hereinafter, a procedure of producing the data sorter 130 that is employable in an embodiment will be described with reference to FIGS. 4 to 7.

Figure 4:
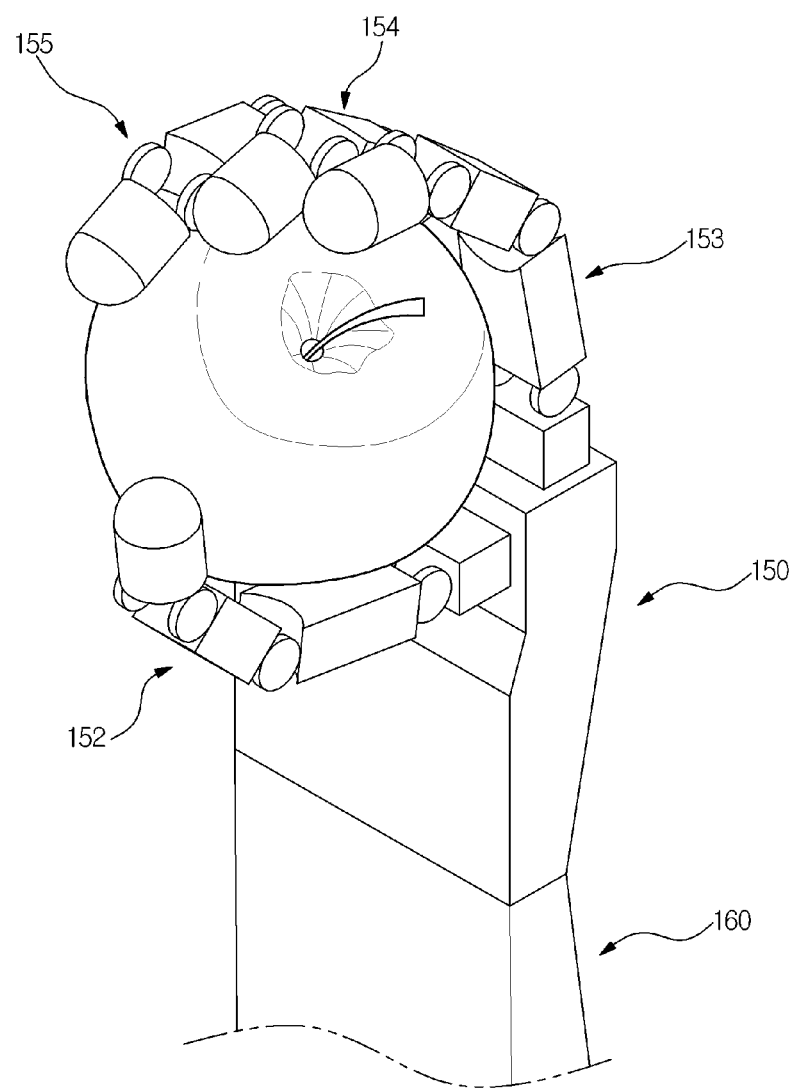
FIG. 4 is a perspective view showing the shape of the robot hand when the robot hand is gripping an apple.

FIG. 4 shows the shape of the robot hand 150 when the robot hand 150 is gripping an apple.

When the robot hand 150 is gripping an apple having a predetermined shape, as shown in FIG. 4, the first finger member 152 to the fourth finger member 155 are bent by predetermined angles, and the first finger member 152 is located at an opposite side from the second finger member 153 to the fourth finger member 155 with the apple interposed therebetween. The finger members have smaller bending angles when not gripping the apple than when gripping the apple.

More specifically, as shown in FIG. 4, the shape of the robot hand 150 when gripping the apple and the shape of the robot hand 150 when not gripping the apple differ from each other. Thus, the data sorter 130 may judge whether or not the robot hand is gripping an object by using the shape of the robot hand 150 as a feature vector. The shape of the robot hand 150 may be recognized by measuring positions of the respective finger members in 3D space. In addition, if the shape of the robot hand 150 varies, values of torque generated from the finger joints of the robot hand 150 vary. Thus, the data sorter 130 may selectively adopt the shape of the robot hand and the finger joint torque.

Figure 5:
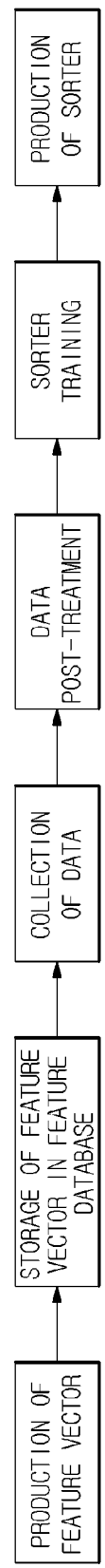
FIG. 5 is a block diagram schematically showing a procedure of producing a data sorter according to an embodiment.

FIG. 5 is a block diagram schematically showing a procedure of producing the data sorter 130 according to an embodiment.

Referring to FIG. 5, feature vectors, which may be used to judge whether or not the robot hand is gripping an object, are produced and stored in a feature database. Here, the feature vectors may be the shape of the robot hand 150, torque generated from the finger joints, and a combination thereof.

After one feature vector is selected, feature data with respect to the selected feature vector when the robot hand 150 is gripping an object and when the robot hand 150 is not gripping the object are respectively collected. The feature data is stored as a labeled value of +1 when the robot hand 150 is gripping the object and as a labeled value of −1 when the robot hand 150 is not gripping the object.

For example, in the case in which the finger joint torque is selected as a feature vector, a torque value when the robot hand 150 is gripping an object and a torque value when the robot hand 150 is not gripping the object are collected. The torque values are stored as labeled values of +1 and −1, respectively.

The stored data is subjected to post-treatment such that the labeled values are normally distributed within a range of −1 to +1. Also, the data sorter 130 may be produced using the stored data. In this case, a data sorter to minimize a cost function is used. This is referred to as sorter training. The cost function may have criteria to minimize an error as represented by the following Equation 1, and may have criteria to maximize a margin.

$$c(x)=\{y(x)-h(x)\}^2 \qquad \text{Equation 1}$$

Here, x denotes a feature vector, c(x) denotes a cost function, y(x) denotes an actual result value for the input x, and h(x) denotes a predicted value of the data sorter 130 for the input x.

By performing the above described procedure on all feature vectors stored in the feature database, the data sorter 130 is produced on a per input feature vector value basis.

Figure 6:
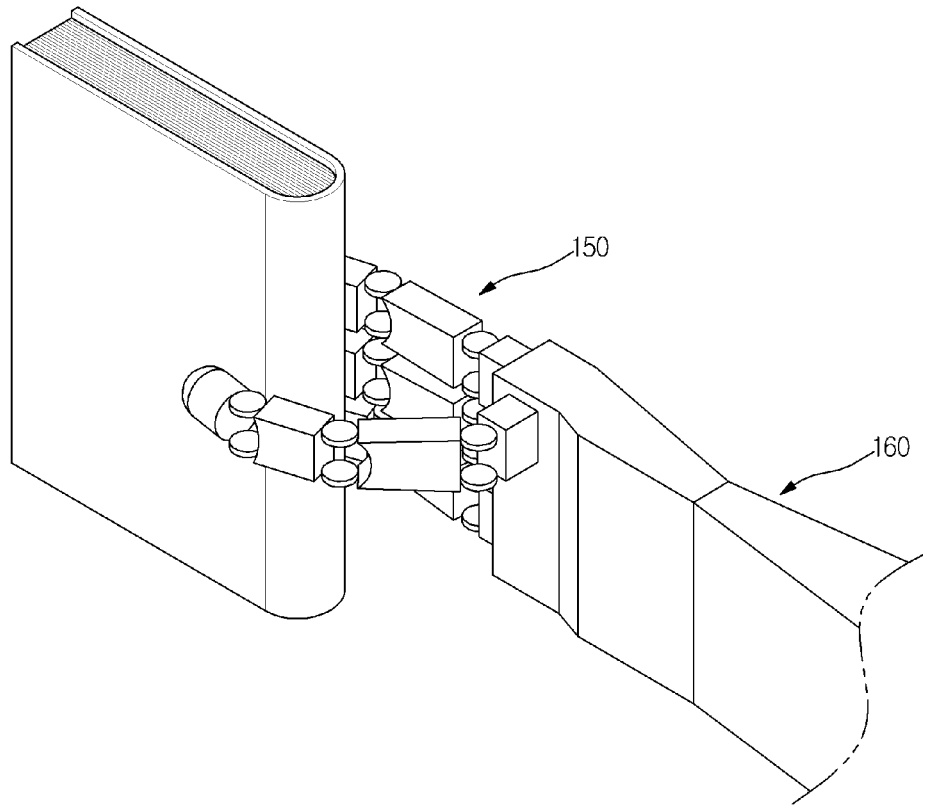
FIG. 6 is a perspective view showing the shape of the robot hand when the robot hand is gripping a book.

FIG. 6 shows the shape of the robot hand when the robot hand is gripping a book. Even when the robot is gripping an object other than an apple, for example, a book, as shown in FIG. 6, the robot hand 150 takes the form of a predetermined shape. When compared with FIG. 4, it will be appreciated that the shape of the robot hand 150 or the finger joint torque when the robot is gripping an apple differ from those when the robot is gripping a book. As such, upon production of the data sorter 130 as described with reference to FIG. 5, feature data may be collected on a per robot graspable object basis, in order to improve the performance of the data sorter 130.

Figure 7:
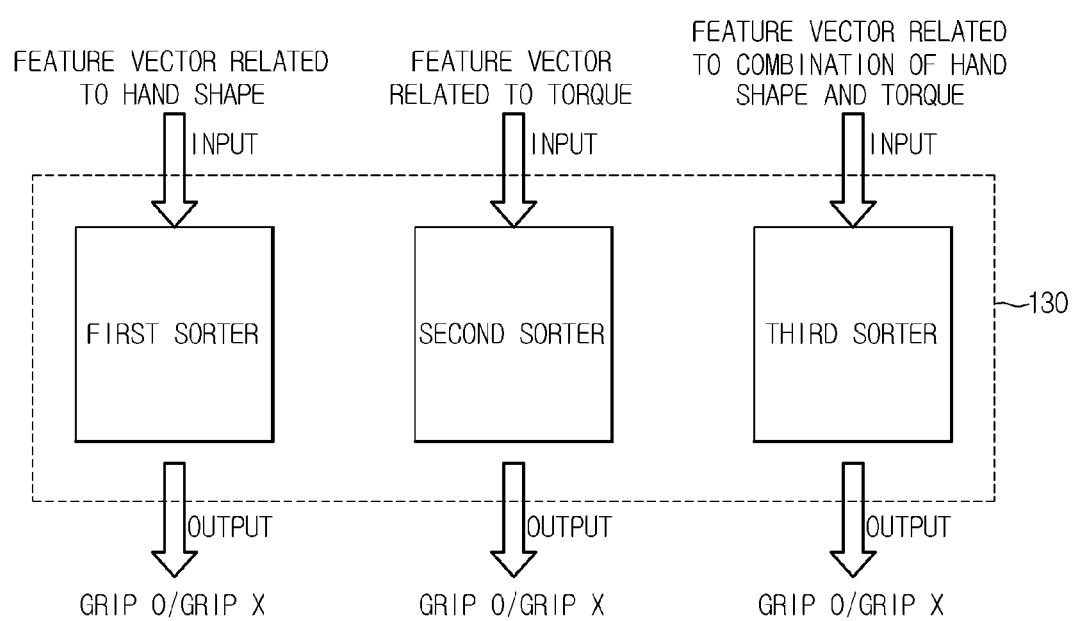
FIG. 7 is a block diagram showing operation of a data sorter according to an embodiment.

FIG. 7 is a block diagram showing operation of the data sorter 130 according to an embodiment.

Referring to FIG. 7, in an embodiment, the shape of the robot hand, the finger joint torque, and a combination thereof may be adopted respectively as a feature vector. Also, a first sorter that adopts the shape of the robot hand 150 as a feature vector, a second sorter that adopts the finger joint torque as a feature vector, and a third sorter that adopts a combination of the shape of the robot hand 150 and the finger joint torque as a feature vector may be produced.

A feature vector related to the shape of the robot hand is input to the first sorter. Here, the feature vector related to the shape of the robot hand may be produced from the measured results of positions of the finger members of the robot hand in 3D space. A feature vector related to the finger joint torque is input to the second sorter. Here, the feature vector related to torque generated from the finger joints of the robot hand may be produced from the measured results of the torque sensors of the respective joints. A feature vector that composes the shape of the robot hand and the finger joint torque is input to the third sorter.

Each sorter outputs a value with respect to the input feature vector. This output value represents the judged result with regard to whether or not the robot hand 150 is gripping an object.

A detailed embodiment will hereinafter be given based on the above description.

In the present embodiment, it is assumed that the finger joint torque of the robot hand is adopted as a feature vector. First, to produce the second sorter that adopts the finger joint torque as a feature vector, corresponding feature data is collected. Assuming that three finger members of the four fingers shown in FIGS. 2 and 3, i.e. the first finger member to the third finger member play a pivotal role in gripping an object, a total of nine finger joints is used to grip the object, and the feature vector related to torque generated from these finger joints is a 9D vector.

Thus, torque 1, torque 2, torque 3, torque 4, torque 5, torque 6, torque 7, torque 8, and torque 9 when the robot is gripping an object are measured in real time and are stored as a labeled value of +1. Torque 1, torque 2, torque 3, torque 4, torque 5, torque 6, torque 7, torque 8, and torque 9 when the robot is not gripping an object are measured in real time and are stored as a labeled value of −1.

In an embodiment, the data is subjected to post treatment such that the labeled values are normally distributed within a range of −1 to +1. Then, the data sorter 130 to minimize a cost function is produced using the data.

After the data sorter 130 is completely produced, the feature vector producing unit 120 extracts torque values of the finger joints from the torque sensors of the finger joints that are actually gripping an object to produce a 3D vector, and inputs the feature vector to the second sorter. The second sorter outputs a value of +1 or −1 based on the judged result.

Figure 8:
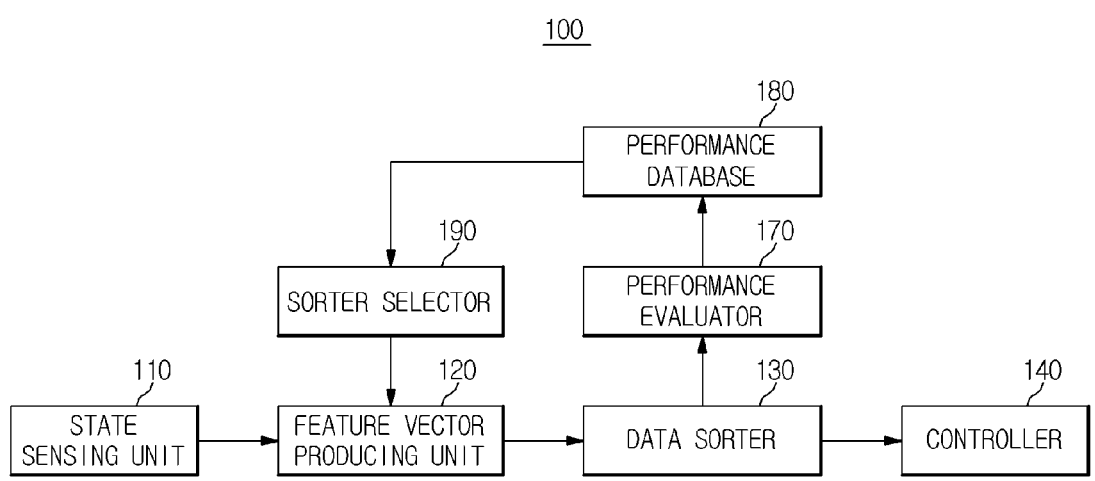
FIG. 8 is a control block diagram of a robot according to an embodiment.

FIG. 8 is a control block diagram of a robot according to an embodiment.

Referring to FIG. 8, the robot according to the present embodiment includes a performance evaluator 170, a performance database 180, and a sorter selector 190, in addition to the state sensing unit 110, the feature vector producing unit 120, the data sorter 130, and the controller 140.

A description of the state sensing unit 110, the feature vector producing unit 120, the data sorter 130, and the controller 140 is identical to that of FIG. 1, and thus will be omitted hereinafter.

In the previously described embodiment of FIG. 7, once the first sorter, the second sorter, and the third sorter have been produced, the performance evaluator 170 evaluates the performance of each data sorter 130 and stores the evaluated values in the performance database 180. A method of evaluating the performance of the sorter may be freely selected from any known technologies.

When judging whether or not the robot is gripping an object, the sorter selector 190 selects the data sorter 130 having the highest performance based on the performance judged result stored in the performance database 180.

After the data sorter 130 is selected, the feature vector producing unit 120 produces a feature vector adopted by the selected data sorter 130. For example, if the sorter selector 190 selects the second sorter, the data sorter 130 extracts torque data for the respective finger joints from the state sensing unit 110 and produces a 9D torque vector using the extracted data.

Hereinafter, an embodiment will be described in more detail with reference to FIG. 8. In the present embodiment, it is assumed that a combination of the shape of the robot hand and the finger joint torque is adopted as a feature vector.

The shape of the robot hand is determined by positions of the finger members, and therefore adopting the shape of the robot hand is equivalent to adopting the measured results of positions of the finger members. Assuming that finger members of the robot hand 150 that play a pivotal role in gripping an object are the first finger member to the third finger member, each finger member has (x, y, z) coordinates in 3D space, and thus a 9D vector is adopted.

First, it may be necessary to produce the first sorter to the third sorter. Hereinafter, only production of the first sorter will be described in brief. Finger 1 position x, finger 1 position y, finger 1 position z, finger 2 position x, finger 2 position y, finger 2 position z, finger 3 position x, finger 3 position y, and finger 3 position z when the robot is gripping an object are measured in real time and stored as a labeled value of +1. Also, finger 1 position x, finger 1 position y, finger 1 position z, finger 2 position x, finger 2 position y, finger 2 position z, finger 3 position x, finger 3 position y, and finger 3 position z when the robot is not gripping an object are measured in real time and stored as a labeled value of −1. Then, the first sorter is produced via data post-treatment and sorter training (or learning).

Then, the second sorter and the third sorter are produced in the same manner. The performance evaluator 170 evaluates the performance of each sorter, and stores the evaluated results in the performance database 180. When judging whether or not the robot is gripping an object, the sorter selector 190 selects the data sorter 130 having the highest performance by searching the performance database 180. For example, if the selected data sorter 130 is the first sorter, the feature vector producing unit 120 extracts position measured data of the respective finger members from the state sensing unit 110 to thereby produce a 9D vector using the data, and inputs the 9D vector to the first sorter.

Then, when the first sorter outputs the judged result to the controller 140, the controller 140 controls operation of the robot based on the result. For example, If the first sorter outputs a value of +1, the controller 140 judges that the robot has succeeded in gripping an object, and may perform a subsequent operation, such as movement of the robot to another place. If the first sorter outputs a value of −1, the controller 140 judges that the robot has failed to grip an object, and resends a grip command to the robot hand 150.

Hereinafter, an embodiment related to a control method for the robot according to an aspect of the disclosure will be described.

The control method for the robot according to an embodiment includes producing the learning-based data sorter 130 that adopts sensed state results of the robot as a feature vector. The control method further includes sensing the state of the robot using the state sensing unit 110, such as a torque sensor, a position sensor, etc, producing a feature vector from the sensed results, judging an operating state of the robot by inputting the produced feature vector to the data sorter 130, and controlling a subsequent operation based on the output result.

Figure 9:
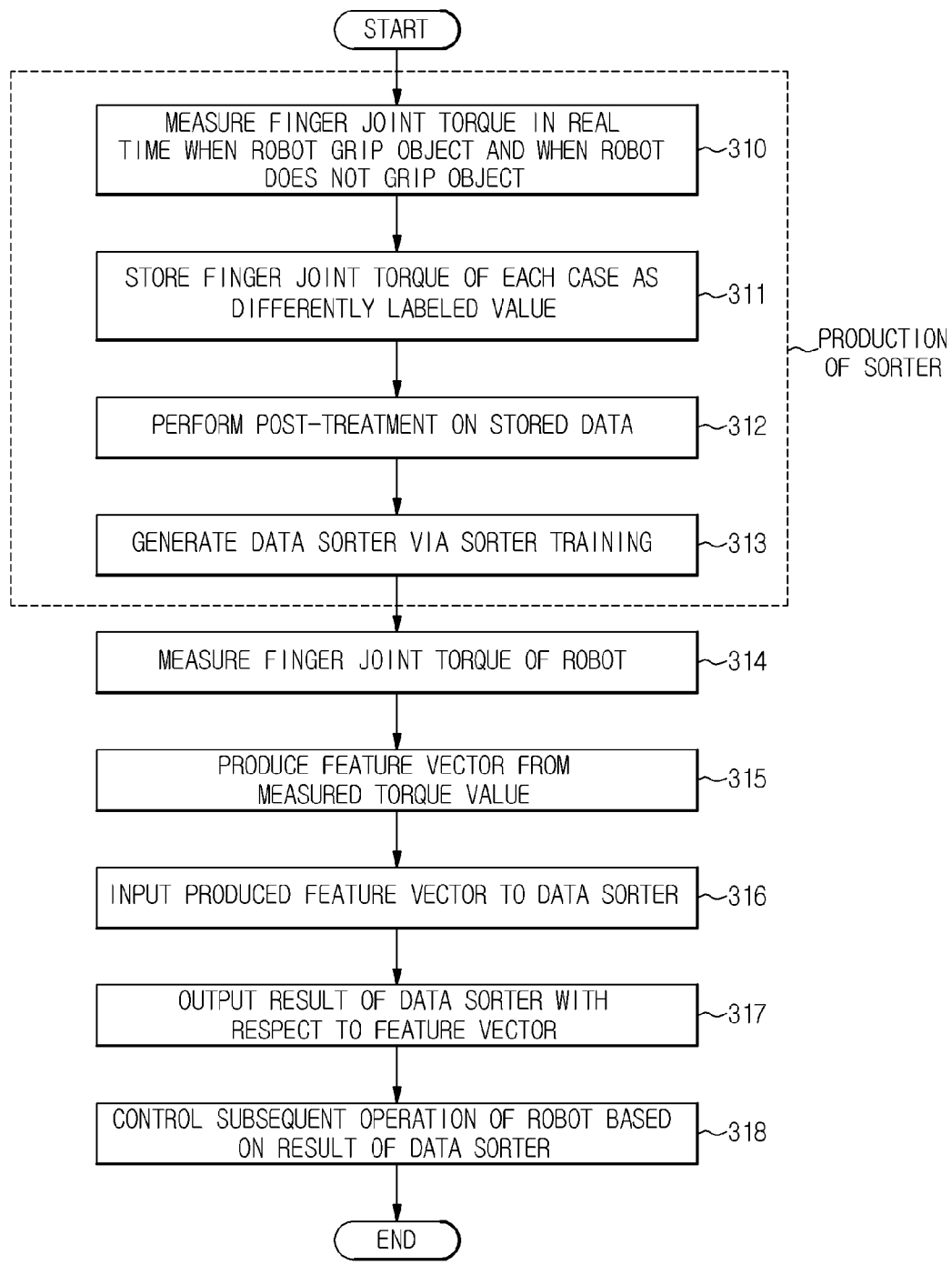
FIG. 9 is a flowchart showing a control method for a robot according to an embodiment in detail.

FIG. 9 is a flowchart showing a control method for a robot according to an embodiment in detail.

In the embodiment of FIG. 9, it is assumed that an operating state to be judged is whether or not the robot is gripping an object, and joint torque with respect to the first finger member to the third finger member of the robot hand is adopted as a feature vector. That is, a 9D vector composed of torque values with respect to nine joints is adopted.

First, to produce the data sorter 130 that adopts the finger joint torque as a feature vector, joint torque of the first finger member to the third finger member when the robot is gripping an object, and joint torque of the first finger member to the third finger member when the robot is not gripping an object are measured in real time (310).

Then, the joint torque when the robot is gripping an object and the joint torque when the robot is not gripping an object are stored as differently labeled feature vector values (311). For example, the feature vector has a labeled value of +1 when the robot is gripping an object, and has a labeled value of −1 when the robot is not gripping an object.

The stored data is subjected to post-treatment (312), and the data sorter 130 to minimize a cost function is produced via sorter training (313).

The finger joint torque is measured when judging whether the robot is gripping an object (314). A feature vector is produced from the measured torque value (315), and the produced feature vector is input to the produced data sorter 130 (316). The data sorter 130 outputs a sorted result with respect to the input feature vector (317).

The controller 140 controls a subsequent operation of the robot based on the output value of the data sorter 130 (318).

Figure 10:
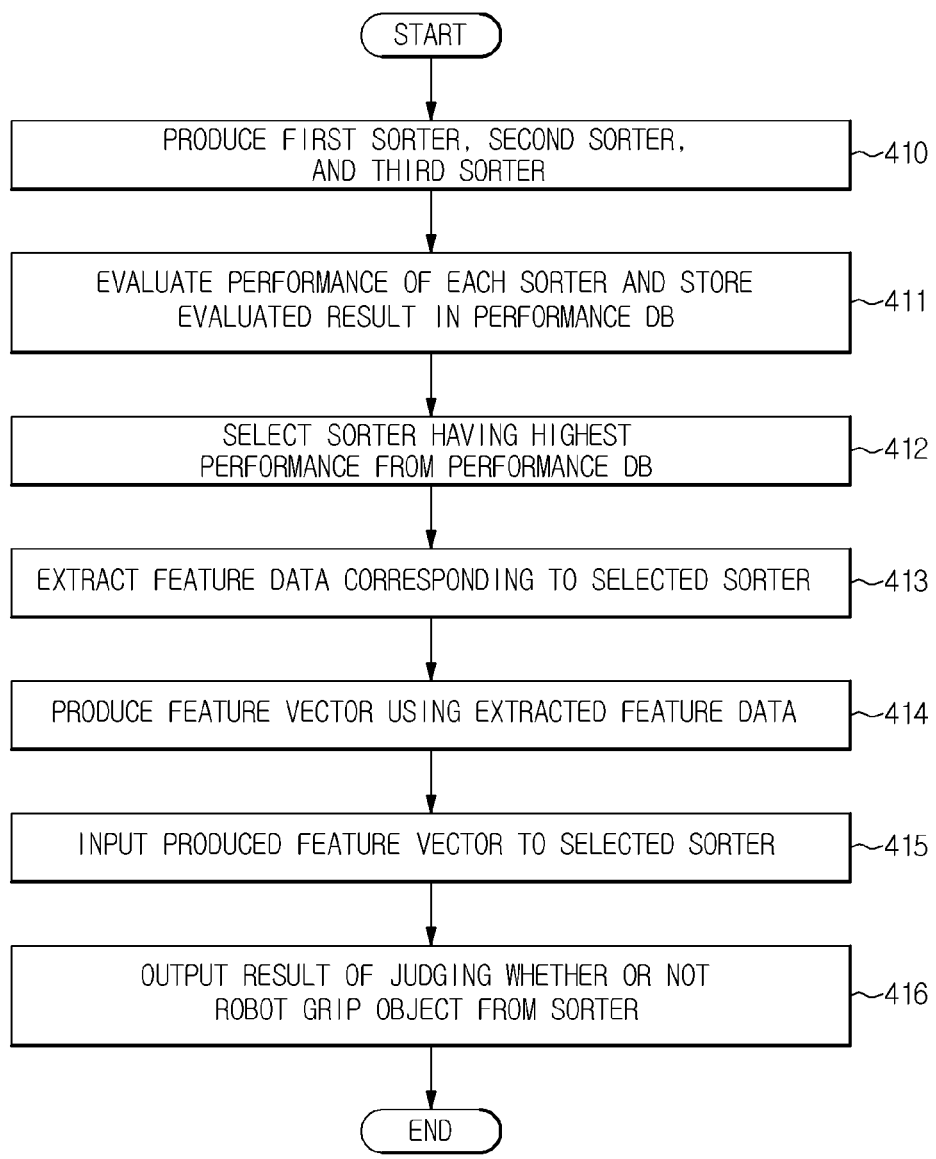
FIG. 10 is a flowchart of the control method for the robot according to an embodiment, in which a data sorter includes a first sorter, a second sorter, and a third sorter.

FIG. 10 is a flowchart of the control method for the robot according to an embodiment, showing an embodiment in which the data sorter includes the first sorter, the second sorter, and the third sorter.

First, the first sorter, the second sorter, and the third sorter are produced (410). Production of the sorter is as described above, and thus, a description thereof will be omitted hereinafter.

The performance of each sorter is evaluated, and the result is stored in the performance database (411). A method of evaluating the performance of the sorter may be freely selected from any known technologies.

The data sorter 130 having the highest performance among the three data sorters 130 is selected by searching the performance database (412). After the data sorter 130 is selected, feature data corresponding to a feature vector adopted in the selected data sorter 130 is extracted (413). For example, if the first sorter is selected, it may be necessary to produce a feature vector related to the shape of the robot hand. Thus, position data of the respective finger members of the robot hand is extracted from the state sensing unit 110.

A feature vector is produced using the extracted feature data (414). For example, if the first sorter is selected and the first sorter adopts a 9D vector with respect to positions of the first finger member to the third finger member, a corresponding feature vector is produced using the extracted feature data.

The produced feature data is input to the selected data sorter 130 (415). The data sorter 130 judges, using the input feature vector, whether or not the robot is gripping an object, and outputs the result (416). Once the data sorter 130 outputs the judged result, the controller 140 controls a subsequent operation of the robot based on the output result.

As is apparent from the above description, through a robot and a control method for the same according to an aspect of the disclosure, it may be possible to accurately detect whether or not the robot is gripping an object without using a tactile sensor, as a result of using a sorter that adopts a feature vector related to a torque generated from a hand's joint and the shape of a robot hand.

Thereby, accurate control based on the result of judging whether or not the robot is gripping an object may be possible, which results in improved quality of service provided by the robot.

Further, it may be possible to improve the ability to deal with an unexpected situation in which the robot has failed to correctly grip an object and missed the object, and to reduce costs by not using a high-price tactile sensor.

The above-described embodiments may be recorded in computer-readable media including program instructions to implement various operations embodied by a computer. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The computer-readable media may also be a distributed network, so that the program instructions are stored and executed in a distributed fashion. The program instructions may be executed by one or more processors. The computer-readable media may also be embodied in at least one application specific integrated circuit (ASIC) or Field Programmable Gate Array (FPGA), which executes (processes like a processor) program instructions. Examples of program instructions include both machine code, such as produced by a compiler, and files containing higher level code that may be executed by the computer using an interpreter. The above-described devices may be configured to act as one or more software modules in order to perform the operations of the above-described embodiments, or vice versa.

Although the embodiments of the present invention have been shown and described, it would be appreciated by those skilled in the art that changes may be made in the embodiment without departing from the principles and spirit of the invention, the scope of which is defined in the claims and their equivalents.

What is claimed is:

1. A robot having a hand, the robot comprising:
a state sensor configured to sense a state of the robot;
a feature vector producer configured to extract feature data from the state sensor and to produce a feature vector using the feature data; and
a learning-based data sorter configured to judge an operating state of the robot using the feature vector produced by the feature vector producer as an input and output the judged result,
wherein the data sorter includes,
a first sorter adopting a feature vector related to a shape of the hand,
a second sorter adopting a feature vector related to a value of torque generated from the joint of the hand, and
a third sorter using a feature vector related to a combination of the shape of the hand and the value of torque generated from the joint of the hand.

2. The robot according to claim 1, further comprising:
a controller configured to control the robot based on the judged result of the data sorter.

3. The robot according to claim 1, wherein the state sensor is configured to sense a torque generated from a joint included in the hand of the robot, or a position of the at least one finger member, the at least one finger member being included in the hand of the robot.

4. The robot according to claim 1, wherein the data sorter is configured to judge whether or not the hand is gripping an object, and output the judged result.

5. The robot according to claim 4, wherein the data sorter is configured to judge whether or not the hand is gripping the object using the feature vector.

6. The robot according to claim 1, further comprising:
a performance evaluator configured to evaluate a performance of each of the first sorter to the third sorter, and store the evaluated result.

7. The robot according to claim 6, further comprising:
a sorter selector configured to select one of the first sorter to the third sorter based on the evaluated result of the performance evaluator.

8. The robot according to claim 7, wherein the feature vector producer is configured to produce a feature vector corresponding to the data sorter selected by the sorter selector.

9. A control method for a robot having a hand, the method comprising:
sensing, by a processor, torque generated from a joint included in the hand, or a position of at least one finger member included in the hand;
producing, by the processor, a feature vector from the sensed data; and
judging, by the processor, an operating state of the robot by inputting the produced feature vector to a learning-based data sorter, and outputting the judged result,
wherein the data sorter includes,
a first sorter adopting a feature vector related to a shape of the hand,
a second sorter adopting a feature vector related to a value of torque generated from the joint of the hand, and
a third sorter using a feature vector related to a combination of the shape of the hand and the value of torque generated from the joint of the hand.

10. The control method according to claim 9, further comprising:
controlling the robot based on the judged result of the data sorter.

11. The control method according to claim 9, wherein the judging judges whether or not the hand of the robot is gripping an object.

12. The control method according to claim 11, wherein the producing produces the feature vector such that the feature vector is related to at least one of a torque generated from the at least one joint of the hand, a shape of the hand, and a combination of the torque generated from the joint and the shape of the hand.

13. The control method according to claim 9, further comprising;
selecting a sorter having the highest performance among the first sorter to the third sorter.

14. The control method according to claim 13, wherein the selecting the sorter selects the sorter having the highest performance based on searching a performance database in which the result of evaluating performance of the sorter is stored.

15. The control method according to claim 13, wherein the producing produces the feature vector to be adopted by the selected sorter.

16. The control method according to claim 9, wherein the feature vector comprises a dimensional element corresponding to data extracted from each finger joint.

17. The control method according to claim 9, further comprising:
   collecting feature vector data on a per robot graspable object basis.

18. A non-transitory computer-readable recording medium storing a program to implement a control method for a robot having a hand, the method comprising:
   sensing, by a processor, torque generated from a joint included in the hand, or a position of at least one finger member included in the hand;
   producing, by the processor, a feature vector using the sensed data; and
   judging, by the processor, an operating state of the robot by inputting the produced feature vector to a learning-based data sorter, and outputting the judged result,
   wherein the data sorter includes,
      a first sorter adopting a feature vector related to a shape of the hand,
      a second sorter adopting a feature vector related to a value of torque generated from the joint of the hand, and
      a third sorter using a feature vector related to a combination of the shape of the hand and the value of torque generated from the joint of the hand.

* * * * *